United States Patent [19]

Karasawa

[11] Patent Number: 4,824,194
[45] Date of Patent: Apr. 25, 1989

[54] LIGHT GUIDE APPARATUS FORMED FROM STRIP LIGHT GUIDES

[75] Inventor: Hiroyuki Karasawa, Kanagawa, Japan

[73] Assignee: Fuji Photo Film Co., Ltd., Kanagawa, Japan

[21] Appl. No.: 172,524

[22] Filed: Mar. 24, 1988

[30] Foreign Application Priority Data

Mar. 25, 1987 [JP] Japan .................................. 62-70881
Jun. 17, 1987 [JP] Japan ................................. 62-150824

[51] Int. Cl.$^4$ .............................................. G02B 6/00
[52] U.S. Cl. ............................ 350/96.10; 350/96.11; 350/96.24; 350/96.25
[58] Field of Search ............... 350/96.10, 96.11, 96.12, 350/96.15, 96.16, 96.24, 96.25; 362/31, 32; 250/227, 483.1, 484.1, 485.1, 486.1, 487.1

[56] References Cited

U.S. PATENT DOCUMENTS

| | | | |
|---|---|---|---|
| 2,825,260 | 3/1958 | O'Brien | 88/1 |
| 3,544,192 | 12/1970 | Goldstein | 350/96.24 X |
| 3,718,515 | 2/1973 | Goldstein | 350/96.24 X |
| 3,933,556 | 1/1976 | Strack | 156/155 |
| 4,026,693 | 3/1977 | Sato | 65/31 |
| 4,113,348 | 9/1978 | Yevick | 350/96.25 |
| 4,151,582 | 4/1979 | Grunberger | 362/31 |
| 4,172,631 | 10/1979 | Yevick | 350/96.25 |
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,346,295 | 8/1982 | Tanaka et al. | 350/96.10 |
| 4,352,550 | 10/1982 | Uchida | 350/96.24 X |
| 4,387,428 | 6/1983 | Ishida et al. | 364/414 |
| 4,485,302 | 11/1984 | Tanaka et al. | 350/96.10 |
| 4,530,565 | 7/1985 | Markle | 350/96.10 |
| 4,570,063 | 2/1986 | De Bie et al. | 350/96.25 X |
| 4,589,731 | 5/1986 | Taniguchi et al. | 350/96.10 X |
| 4,671,606 | 6/1987 | Yevick | 350/96.10 |
| 4,748,680 | 5/1988 | Margolin | 350/96.24 |

FOREIGN PATENT DOCUMENTS

| | | | |
|---|---|---|---|
| 2736486 | 2/1978 | Fed. Rep. of Germany | 350/96.10 X |
| 2951501 | 7/1980 | Fed. Rep. of Germany | 350/96.10 X |
| 56-11395 | 4/1981 | Japan | 350/96.10 X |
| 1250556 | 10/1971 | United Kingdom | 362/31 |

Primary Examiner—William L. Sikes
Assistant Examiner—Brian M. Healy
Attorney, Agent, or Firm—Sughrue, Mion, Zinn, Macpeak & Seas

[57] ABSTRACT

A light guide is formed of a plurality of strip-like light guide materials each of which has first and second end faces. The light guide materials are arranged and connected together side by side at respective end portions including said first end faces so that the first end faces form a linearly extending light input face and are bent at respective intermediate portions so that respective the other end portions including said second end faces extend substantially in parallel to the light input face. Said the other end portions of the respective strip-like light guide materials are superposed one on another and bundled so that the second end faces form a light output face in a plane substantially perpendicular to the light input face.

6 Claims, 8 Drawing Sheets

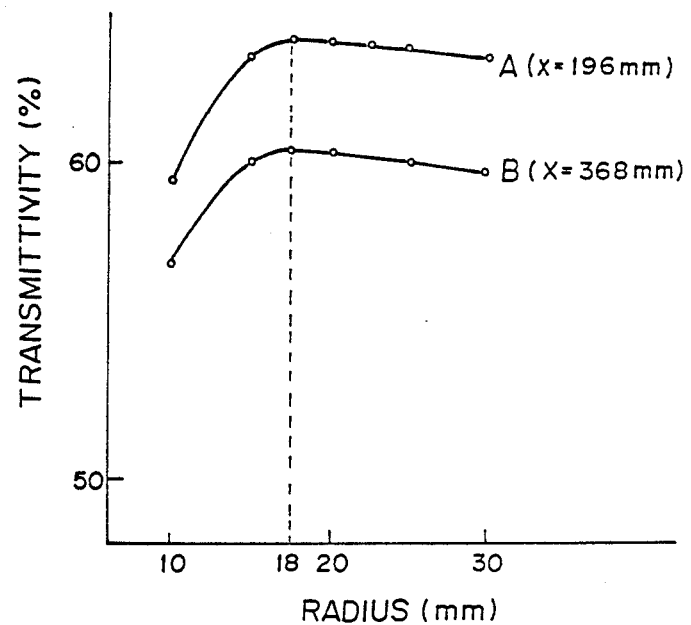
F I G. 5

F I G. 11
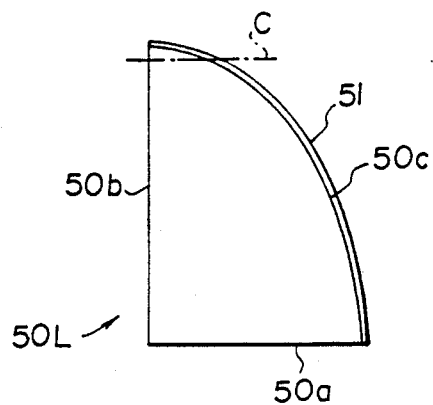
F I G. 12
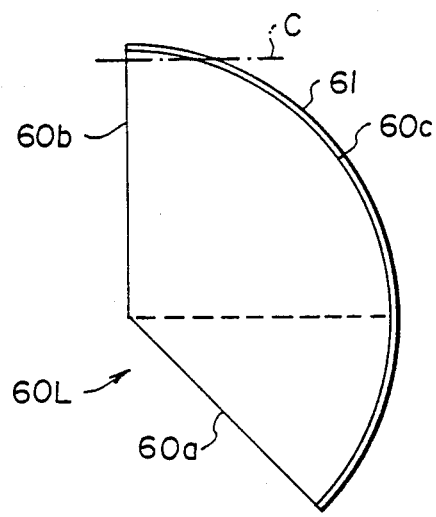
F I G. 13
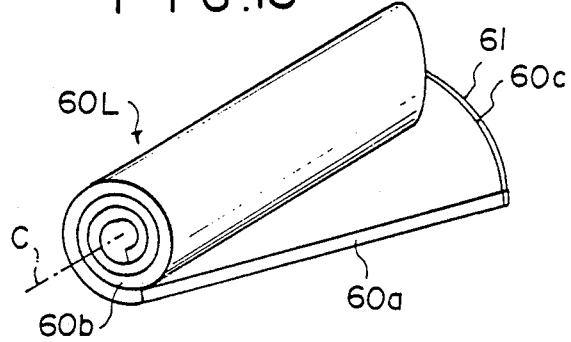

LIGHT GUIDE APPARATUS FORMED FROM STRIP LIGHT GUIDES

BACKGROUND OF THE INVENTION

1. Field of the Invention

This invention relates to a light guide which transmits light from one end face thereof to the other end face thereof.

2. Description of the Prior Art

There has been put into practice in various optical devices a light guide for transmitting light from one end face positioned close to a light emitting position to the other end face connected to a photodetector or the like. For example, such a light guide is used in a radiation image recording and reproducing system disclosed, for instance, in U.S. Pat. Nos. 4,258,264, 4,276,473, 4,315,318 and 4,387,428 and Japanese Unexamined Patent Publication No. 56(1981)-11395.

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor. In said radiation image recording and reproducing system, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays which cause the stimulable phosphor sheet to emit light in proportion to the stored radiation energy. The light emitted by the stimulable phosphor sheet upon stimulation thereof is photoelectrically detected and converted to an electric image signal by a photodetector, and the radiation image of the object is reproduced as a visible image by use of the image signal on a recording medium such as a photographic film, a display device such as a cathode ray tube (CRT), or the like. The light guide is used in a radiation image read-out apparatus of the radiation image recording and reproducing system as a means for transmitting the light emitted by the stimulable phosphor sheet to the photodetector such as a photomultiplier. An example of the radiation image read-out apparatus is shown in FIG. 16.

In FIG. 16, a stimulating light beam 101a of a predetermined intensity is emitted from a stimulating light source 101 to impinge upon a light deflector such as a galvanometer mirror 102. The stimulating light beam 101a is deflected by the galvanometer mirror 102 to impinge upon a stimulable phosphor sheet 103 positioned below the galvanometer mirror 102 so that the stimulable phosphor sheet 103 is scanned by the stimulating light beam 101a in the main scanning direction, i.e., in the width direction of the sheet 103 as indicated by arrow A. While the stimulating light beam 101a impinges upon the stimulable phosphor sheet 103, the sheet 103 is conveyed in the sub-scanning direction as indicated by arrow B, for example, by an endless belt device 109. Therefore, scanning in the main scanning direction is repeated at an angle approximately normal to the sub-scanning direction, and the whole surface of the stimulable phosphor sheet 103 is two-dimensionally scanned by the stimulating light beam 101a.

As the stimulable phosphor sheet 103 is scanned by the stimulating light beam 101a the portion of the sheet 103 exposed to the stimulating light beam 101a emits light having an intensity proportional to the stored radiation energy. The light emitted by the stimulable phosphor sheet 103 enters a transparent light guide 104 from its light input face 104a positioned close to the sheet 103 in parallel to the main scanning line. As shown in FIG. 17, the light guide 104 has a flat-shaped front end portion 104b positioned close to the stimulable phosphor sheet 103 and is shaped gradually into a cylindrical shape towards the rear end side to form a substantially cylindrical rear end portion 104c which is closely contacted with a photomultiplier 105. The light entering the light guide 104 from its light input face 104a is guided inside of the light guide 104 by total internal reflection up to the rear end portion 104c, and is received by the photomultiplier 105 by way of a filter (not shown) which selectively transmits the light emitted by the stimulable phosphor sheet 103. Thus the light emitted by the stimulable phosphor sheet 103 in proportion to the radiation energy stored therein is detected and converted into an electric image signal by the photomultiplier 105. The electric image signal thus obtained is sent to an image processing circuit 106 and processed therein. The electric image signal thus processed is then reproduced into a visible image and displayed, for example, on a CRT 7, or is stored in a magnetic tape 108.

The light input face of the light guide must extend along the main scanning line, the light output end must be in such a shape as to permit connection to the photomultiplier having a small width, and the light guide must be uniform in width and thickness since light is transmitted through the light guide by total internal reflection. Accordingly, the light guide is formed by rolling an end portion of a rectangular light guide sheet material to conform to the shape of the photomultiplier as shown in FIG. 17. The conventional light guide having such a shape is disadvantageous in that the dimension in the direction perpendicular to the light input face is large to enlarge the size of the overall radiation image read-out apparatus.

When the light guide for the radiation image read-out apparatus is formed of a bundle fiber comprising a plurality of optical fibers bundled into a flat plate shape, the overall size of the apparatus can be reduced since the bundle fiber can be relatively freely deformed. However since the light input face of the bundle fiber is formed by a plurality of light input faces of the optical fibers forming the bundle fiber, the spaces which cannot contribute to transmission of light are formed between the light input faces of the respective optical fibers. Therefore, the light transmitting efficiency of the bundle fiber is as low as several percents and is 50% at most, and the bundle fiber cannot be practically used for transmitting weak light. Further since the bundle fiber is formed of a plurality of optical fibers as described above, the light transmitting efficiency substantially fluctuates in the light input face, and shading is generated at small intervals in each scanning line due to the fluctuation of the light transmitting efficiency. Since this shading is increased as the distance between the light input face of the bundle fiber and the scanning position is reduced, influence of the shading can be lowered by positioning the light input face of the bundle fiber at a large distance from the scanning position.

However, when the distance between the scanning position and the light input face of the bundle fiber is enlarged, the amount of light entering the bundle fiber is inherently reduced. In the case where the reflected light is received by the bundle fiber, reduction in the amount of light can be compensated for by increasing the amount of the scanning light beam. However, in the case of the aforesaid radiation image read-out apparatus, increase in the intensity of light emitted from the stimulable phosphor sheet with increase in the amount of stimulating light beam is just slight. Accordingly, in the aforesaid radiation image read-out apparatus, the bundle fiber cannot be practically used as the light guide.

SUMMARY OF THE INVENTION

In view of the foregoing observations and description, the primary object of the present invention is to provide a light guide which is formed of a sheet-like light guide material to be able to be used as a light guide for the aforesaid radiation image read-out apparatus and can be small in size as measured in the direction perpendicular to the light input face thereof so that the overall size of the apparatus in which the light guide is to be incorporated can be reduced.

In accordance with one aspect of the present invention, there is provided a light guide comprising a plurality of strip-like light guide materials each of which has first and second end faces and which are arranged and connected together side by side at respective end portions including said first end faces so that the first end faces form a linearly extending light input face and are bent at respective intermediate portions so that respective the other end portions including said second end faces extend substantially in parallel to the light input face, said the other end portions of the respective strip-like light guide materials being superposed one on another and bundled so that the second end faces form a light output face in a plane substantially perpendicular to the light input face.

In accordance with another aspect of the present invention, there is provided a light guide comprising a light guide sheet material which has a linearly extending light input end face, a light output end face at an angle to the light input end face and an arcuate end face which joins the outer ends of the light input end face and the light output end faces and is convex outward, the arcuate end face being provided with a light reflecting layer, and said light guide sheet material being rolled about an axis substantially perpendicular to the light output end face with the light input face being positioned outer side of the roll.

BRIEF DESCRIPTION OF THE DRAWINGS

FIG. 5 is a graph showing the relation between the light transmitting efficiency and the extent of bending of the light guide material, FIGS. 10 to 12 are plan views respectively showing light guide sheets for forming light guides in accordance with fourth to sixth embodiments of the present invention, FIG. 13 is a perspective view of the light guide of the sixth embodiment.

DESCRIPTION OF THE PREFERRED EMBODIMENTS

Figure 1:
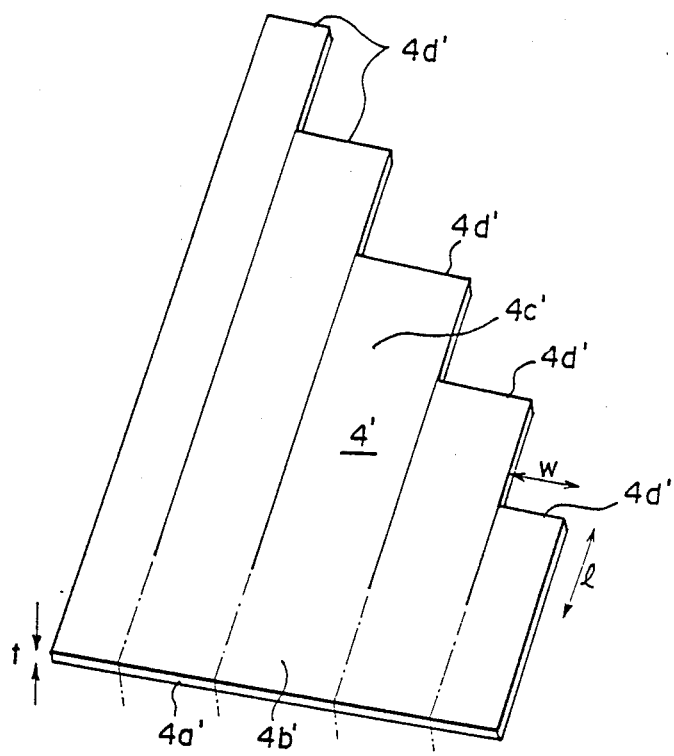
FIG. 1 is a perspective view showing a light guide material for forming a light guide in accordance with a first embodiment of the present invention.
Figure 2:
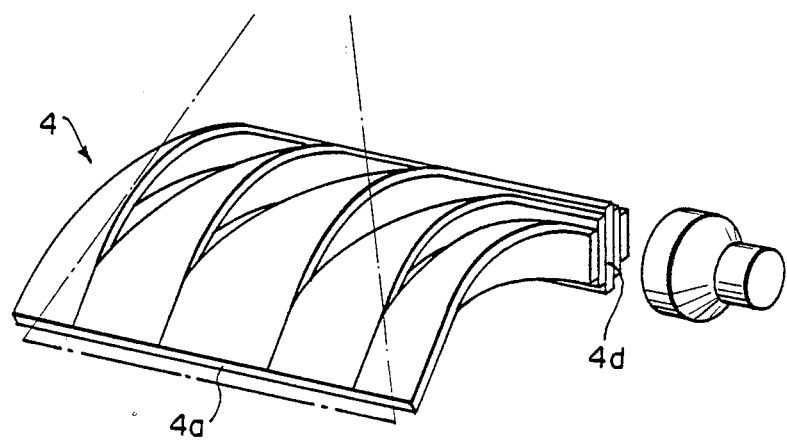
FIG. 2 is a perspective view of the light guide of the first embodiment.

In FIG. 1, a light guide material 4', which may be, for instance, an acrylic sheet, has a uniform thickness of t, and has linearly extending front and rear end faces $4a'$ and $4d'$. The portion $4c'$ of the light guide material 4' except the front end portion $4b'$ including the front end face $4a'$ is cut along a plurality of lines extending in perpendicular to the front end face $4a'$ to form a plurality of strip like portions which are five in number in this particular embodiment. The central strip-like portion is the largest in width w and the outermost strip-like portions are the smallest in width. The lengths 1 of the strip-like portions gradually increase from the right side to the left side. The strip-like portions are bent rightward (toward the shortest strip-like portion) so that the rear end portions including the rear end faces $4d'$ extend in parallel to the front end face $4a'$ and the rear end portions are superposed one on another and bundled so that the rear end faces $4d'$ of the strip-like portions form a flat surface perpendicular to the front end face $4a'$, whereby a light guide 4 having a linearly extending light input face $4a$ and a light output face $4d$ perpendicular to the light input face $4a$ is formed as shown in FIG. 2. The lengths 1 of the strip-like portions are selected so that when the strip-like portions are bent to substantially the same extents, the rear end faces $4d'$ come to be flush with each other.

As in the conventional light guide, the light input face $4a$ of the light guide 4 of this embodiment is positioned along the main scanning line and the light output face $4d$ is connected to a photodetector such as a photomultiplier. In this particular embodiment, the width of the strip-like portions are gradually increased from the sides to the center as described above and accordingly, the shape of the light output face $4d$ approximates to a circle. This is advantageous in connecting the light output face $4d$ to the circular photomultiplier. However, the widths of all the strip-like portions may be equal to each other so that a rectangular light output face is formed.

In the light guide 4 of this embodiment, light emitted by the portion exposed to the scanning light beam enters the light guide from the light input face 4a with a high efficiency since the light input face 4a may be positioned close to the portion. Since the light guide 4 of this embodiment is formed of a sheet-like light guide material uniform in thickness and width, the light entering the light guide 4 travels inside of the light guide 4 by total internal reflection and reaches the light output face 4d with a high efficiency. Further, the size of the light guide 4 as measured in perpendicular to the light input face 4a is one third to a half of the conventional one since the light output face is formed in perpendicular to the light input face. That is, in accordance with the light guide 4 of this embodiment, the overall size of the apparatus in which the light guide is to incorporated can be reduced without deteriorating the light transmitting efficiency. Though the major part of light entering the light guide material described above are transmitted therethrough by total internal reflection, a very small part of the light is absorbed or leaks outside every time the light is reflected. Accordingly, as the length of the optical path in the light guide increases, the light transmitting efficiency is deteriorated by a small amount. In the light guide 4 of this embodiment, since the optical path for the light entering the light guide 4 from a portion near the photomultiplier is shorter than the that for the light entering the light guide from a portion remote from the photomultiplier, difference in the light transmitting efficiency can be produced. However, the difference is simple and corresponds to the shape of the light guide and does not change with age. Accordingly, the difference can be compensated for by, for instance, changing the position of junction to the photomultiplier according to the strip-like portions, or electrically adjusting the output of the photomultiplier. The light guide material 4' may be cut throughout the length as shown by the chain lines in FIG. 1. In this case, boundary lines are produced on the light input face of the light guide, and the light transmitting efficiency is deteriorated at the boundary lines cause shading. However, the shading can be electrically compensated for with ease. Further, the light input face and the light output face need not be strictly perpendicular to each other but may be slightly at an angle to each other so long as the size of the light guide as measured in perpendicular to the light input face can be reduced.

Figure 3:
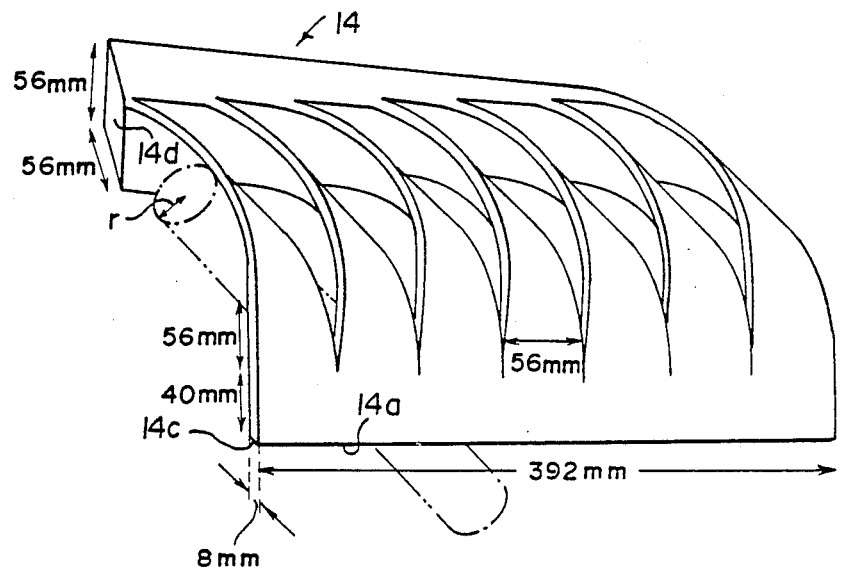
FIG. 3 is a light guide in accordance with a second embodiment of the present invention.

The light guide in accordance with the present invention may be produced by molding of light guide material as shown in FIG. 3.

The light guide 14 shown in FIG. 3 is substantially the same as the light guide 4 shown in FIG. 2 except that the widths of all the strip-like portions are the same and the rear end portions of the strip-like portions including the rear end faces are integrally formed into a block-like shape. Also the light guide 14 has a linearly extending light input face 14a and a light output face 14d perpendicular to the light input face 14a. When the light guide is integrally molded as in this embodiment, a plurality of light guides having a predetermined shape can be easily produced without polishing or the like.

In both the embodiments described above, light entering the light guide is transmitted through the light guide by total internal reflection, and accordingly, when the light guide material is bent to have an excessively small radius of curvature, total internal reflection condition is broken and total internal reflection loss is increased. On the other hand, for a given position of the light output face as viewed in parallel to the light input face, the optical path in the light guide becomes longer as the radius of curvature of the bent portion becomes larger, and loss due to absorption light in the light guide is increased. For example, the extent of bending of the light guide material can be represented by a radius r of a cylinder inscribed in the bent portion of the light guide material as shown by the chain line in FIG. 3. FIG. 5 shows relation between the radius r and the light transmitting efficiency of the light guide 14 detected by connecting a photodetector to the light output face 14d. The light transmittivity of the material forming the light guide 14 is 91%, and curve A in FIG. 5 represents the relation in the case that the distance x between the light detecting side edge 14c of the light input face 14a and the light emitting position below the light input face 14a is 196mm while curve B represents the relation in the case that the distance x is 368mm.

Figure 16:
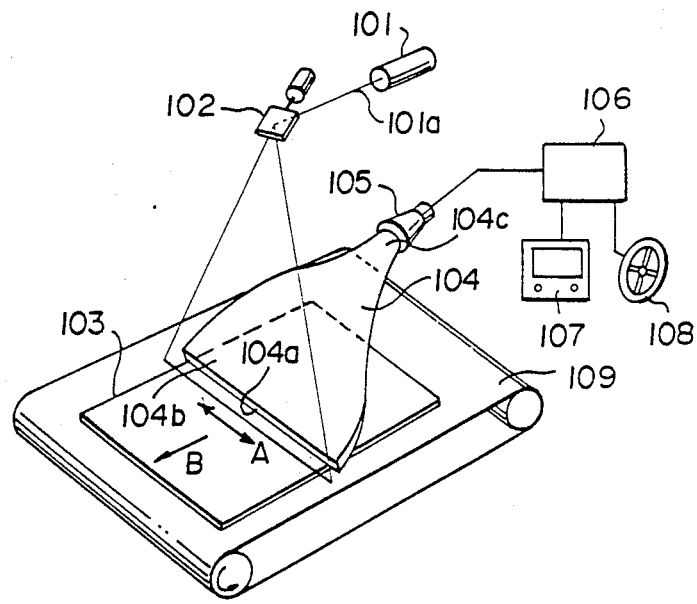
FIG. 16 is a perspective view showing a radiation image read-out apparatus provided with a conventional light guide.
Figure 17:
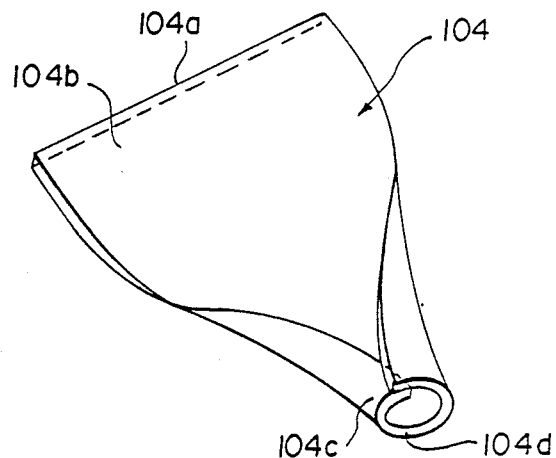
FIG. 17 is a perspective view showing the conventional light guide employed in the radiation image read-out apparatus.

As can be understood from FIG. 5, the total internal reflection loss is abruptly increased as the radius r becomes smaller than a certain value, while the loss due to light absorption in the light guide is gradually increased due to increase in the length of the optical path. In the of this particular embodiment, the light transmitting efficiency can be maximized by setting the radius r to about 18mm. Since the light transmitting efficiency of the conventional light guides shown in FIGS. 16 and 17 is generally 65%, the light transmitting efficiency of the light guide of this embodiment is equivalent to that of the conventional one. Though, in this embodiment, the bent portions of the strip-like portions is shaped to circumscribe a cylinder, the strip-like portions may be bent into other various shapes and may be bent into shapes different from each other.

Figure 4:
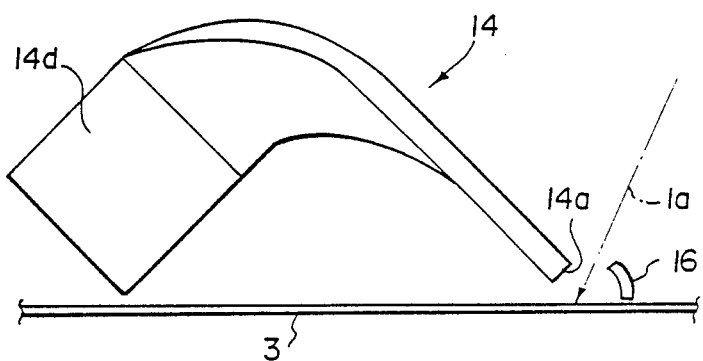
FIG. 4 is a side view showing the light of the second embodiment opposed to a stimulable phosphor sheet.

When the light guide 14 of this embodiment is used in the aforesaid radiation image read-out apparatus employing a stimulable phosphor sheet 3, it is preferred that a reflecting mirror 16 be provided on the side of the scanning position opposite to the light input face 14a to reflect, toward the light input face 14a, light emitted from the sheet 3 and traveling away from the light input face 14a. Further, it is preferred that the light input face 14a and the reflecting mirror 16 be provided with an antireflection coating which prevents reflection of the stimulating light beam 1a in order to prevent the stimulating light beam 1a from being reflected by them after reflected by the sheet 3 to impinge upon a part of the sheet 3 deviated from the scanning position. Further, it is preferred that the light output face 14d (Though the light output face 14d is practically connected to a photomultiplier, the photomultiplier is not shown in FIG. 4.) be provided with a filter which transmits light emitted by the stimulable phosphor sheet 3 but absorbs the stimulating light beam.

Figure 6:
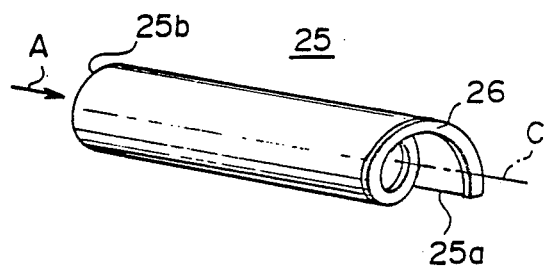
FIG. 6 is a perspective view showing a third embodiment of the present invention.

FIG. 6 shows a light guide 25 in accordance with another embodiment of the present invention. The light guide 25 is formed by rolling a light guide sheet 25L shown in FIG. 7. The light guide sheet 25L is of a transparent acrylic sheet and is a quarter circle in shape in this particular embodiment. The light guide sheet 25L has first and second linear end faces 25a and 25b which extend in radial directions in perpendicular to each other, and an arcuate end face 25c joining the outer ends of the end faces 25a and 25b. The arcuate end face 25c is provided with a light reflecting layer 6 by, for instance, aluminum deposition. The light guide 25 of this embodiment is formed by rolling the sheet 25L about an axis C perpendicular to the end face 25b. The sheet 25L is rolled so that the outer side of the second linear end face 25b is positioned inside of the roll and the first linear end face 25a is positioned outside of the roll. As clearly shown in FIG. 8, the end portion of the sheet 25L on the side of the first linear end face 25a extends linearly away from the outer surface of the portion positioned on the inner side of the end portion.

Figure 9:
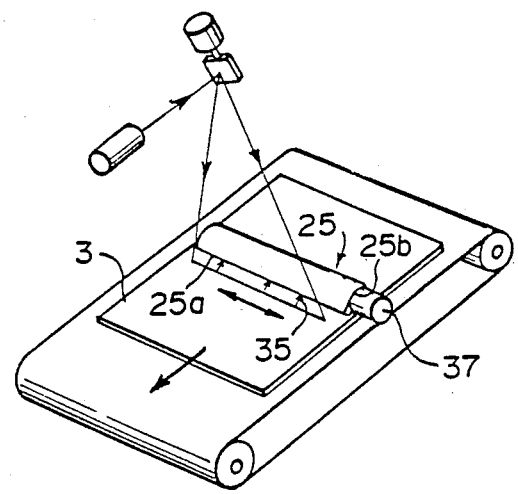
FIG. 9 is a schematic perspective view showing the light guide of the third embodiment set to a radiation image read-out apparatus.

The light guide 25 of this embodiment is used, for instance, in the aforsaid radiation image read-out apparatus in the manner shown in FIG. 9. That is, the first linear end face 25a functions as the light input face and is disposed to extend along the main scanning line on the stimulable phosphor sheet 3. The second linear end face 25b which has been rolled into a circle functions as the light output face and is connected to a photodetector 37 such as a photomultiplier.

Figure 7:
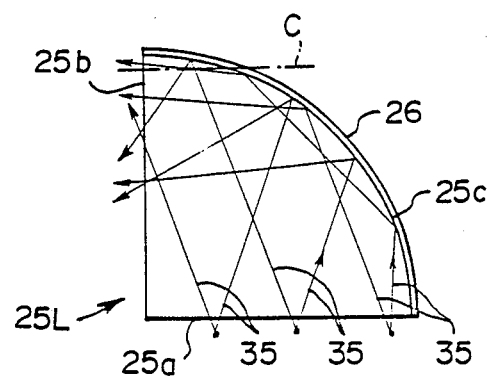
FIG. 7 is a plan view of a light guide sheet for forming the light guide of the third embodiment.
Figure 8:
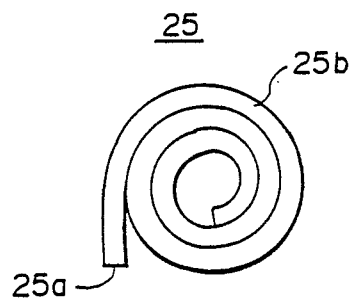
FIG. 8 is a side view of the light guide of the third embodiment.

Light 35 emitted by the stimulable phosphor sheet 3 upon stimulation enters the light guide 25 from the light input face 25a. As shown in FIG. 7, a part of the light 15 entering the light guide 25 is reflected toward the light output face 25b by the arcuate end face 25c, and the other part of the light 15 directly travels to the light output face 25b. Since the light 15 emitted by the stimulable phosphor sheet 3 is nondirectional and the light 15 emitted from a certain point on the stimulable phosphor sheet 3 impinges upon the arcuate end face 25c at various angles. Since the arcuate end face 25c is of a quarter circle, the light impinging thereon at any angle is reflected toward the light output end face 25b.

So long as the radius of curvature is larger than a predetermined value, total internal reflection condition is satisfied with respect to the thickness direction of the light guide sheet 25L, and accordingly, light transmitting loss is little.

Figure 10:
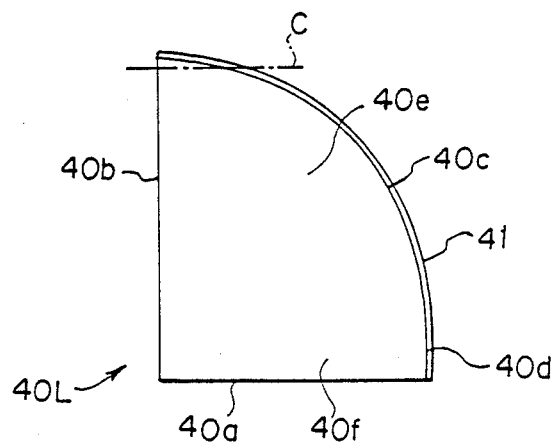

In accordance with another embodiment of the present invention, a light guide is formed by rolling a light guide sheet 40L comprising a quarter-circular portion 40e and a rectangular portion 40f integrally connected to one of the linear end faces of the quarter-circular portion 40e as shown in FIG. 10. The light guide sheet 40L is rolled from the upper (as seen in FIG. 10) side about an axis C. In this embodiment, linear end faces 40a and 40b function respectively as the light input face and the light output face, and an arcuate end face portion 40c of the quarter-circular portion 40e and a linear end face 40d of the rectangular portion 40f are provided with a light reflecting layer 41.

In accordance with still another embodiment of the present invention, a light guide is formed by rolling a light guide sheet 50L which is a quarter-ellipsoid in shape as shown in FIG. 11. The light guide sheet 50L is rolled from the upper (as seen in FIG. 11) side about an axis C. In this embodiment, linear end faces 50a and 50b function respectively as the light input face and the light output face, and an arcuate end face 50c is provided with a light reflecting layer 51.

In accordance with still another embodiment of the present invention, a light guide is formed by rolling a light guide sheet 60L which is a sector having an included angle larger than 90° in shape as shown in FIG. 12. The light guide sheet 60L is rolled from the upper (as seen in FIG. 12) side about an axis C. However, the portion below the broken line in FIG. 12 is not rolled as shown in FIG. 13. In this embodiment, linear end faces 60a and 60b function respectively as the light input face and the light output face, and an arcuate end face 60c is provided with a light reflecting layer 61.

Figure 14:
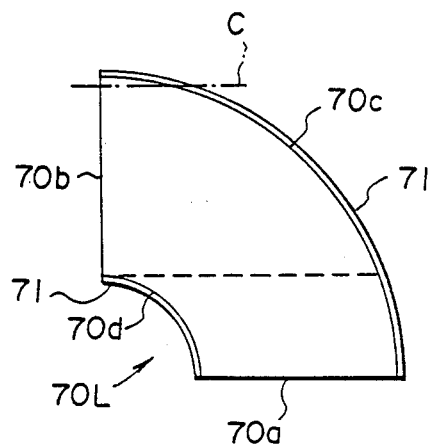
FIG. 14 is a plan view showing a light guide sheet for forming a light guide in accordance with a seventh embodiment of the present invention.
Figure 15:
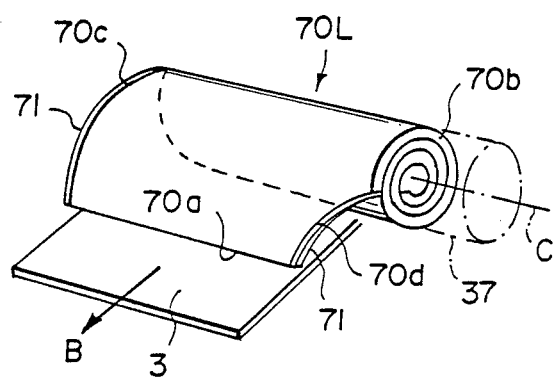
FIG. 15 is a perspective view of the light guide of the seventh embodiment.

In accordance with still another embodiment of the present invention, a light guide is formed by rolling a light guide sheet 70L which is like a quarter of a doughnut in shape as shown in FIG. 14. The light guide sheet 70L is rolled from the upper (as seen in FIG. 14) side about an axis C. However, the portion below the broken line in FIG. 14 is not rolled as shown in FIG. 15, and accordingly, the photodetector 37 to be connected to the light guide can be positioned removed from the edge of the stimulable phosphor sheet 3. In this embodiment, linear end faces 70a and 70b function respectively as the light input face and the light output face, and outer and inner arcuate end faces 70c and 70d are provided with a light reflecting layer 71.

Though the light guides in accordance with the embodiments described above are formed by rolling a light guide sheet, they may be integrally formed, for instance, by injection molding. Further, the arcuate end joining the outer ends of the respective linear end faces may be of other various shapes, e.g., a part of a parabola, a part of a hyperbola, or the like.

I claim:

1. A light guide comprising a plurality of strip-like light guide materials each of which has first and second end faces and which are arranged and connected together side by side at respective end portions including said first end faces so that the first end faces form a linearly extending light input face and are bent at respective intermediate portions so that respective the other end portions including said second end faces extend substantially in parallel to the light input face, said the other end portions of the respective strip-like light guide materials being superposed one on another and bundled so that the second end faces form a light output face in a plane substantially perpendicular to the light input face.

2. A light guide as defined in claim 1 in which said strip-like light guide materials are formed by cutting a light guide material sheet having linearly extending first and second end faces along a plurality of lines perpendicular to the first end face with the first end face kept uncut, said first end face forming said light input face and the second end face forming said light output face.

3. A light as defined in claim 1 in which said the other end portions of the strip-like light guide materials are integrally formed.

4. A light guide comprising a light guide sheet material which has a linearly extending light input end face, a light output end face at an angle to the light input end face and an arcuate end face which joins the outer ends of the light input end face and the light output end faces and is convex outward, the arcuate end face being provided with a light reflecting layer, and said light guide sheet material being rolled about an axis substantially perpendicular to the light output end face with the light input face being positioned on the outer side of the roll.

5. A light guide as defined in claim 4 in which said light guide sheet material is a quarter of a circle in shape, and the radially extending end faces of the sheet material respectively form said light input end faces and the light output end faces.

6. A light guide as defined in claim 1 or 2 in which the end portion of said light guide sheet material including said light input end face is not rolled to linearly extend away from the rolled portion thereof.

* * * * *